(12) United States Patent
Meyer et al.

(10) Patent No.: US 8,061,654 B2
(45) Date of Patent: Nov. 22, 2011

(54) LOCKING SYSTEM

(75) Inventors: Jörg Meyer, Baienfurt (DE); Ulrich Grabherr, Opfenbach (DE); Daniel Maier, Apfelberg (AT); Walter Starzacher, Langenwang (AT); Michael Huber, Graz (AT)

(73) Assignee: Liebherr—Aerospace Lindenberg GmbH, Lindenberg/Allgäu (DE)

( * ) Notice: Subject to any disclaimer, the term of this patent is extended or adjusted under 35 U.S.C. 154(b) by 664 days.

(21) Appl. No.: 12/217,628

(22) Filed: Jul. 8, 2008

(65) Prior Publication Data
US 2009/0071207 A1 Mar. 19, 2009

(30) Foreign Application Priority Data

Jul. 13, 2007 (DE) .......................... 10 2007 032 779

(51) Int. Cl.
*B64C 25/26* (2006.01)

(52) U.S. Cl. ................................ 244/102 A; 244/102 R
(58) Field of Classification Search .............. 244/100 R, 244/102 R, 102 A, 102 SL; 292/98
See application file for complete search history.

(56) References Cited

U.S. PATENT DOCUMENTS

| 3,652,039 A * | 3/1972 | Lucien ...................... 244/102 A |
| 5,288,037 A * | 2/1994 | Derrien ..................... 244/102 SL |
| 6,811,118 B2 | 11/2004 | Collet et al. |
| 2006/0163426 A1 * | 7/2006 | Smith, III ................. 244/102 R |

* cited by examiner

*Primary Examiner* — Rob Swiatek
(74) *Attorney, Agent, or Firm* — Dilworth & Barrese, LLP.

(57) ABSTRACT

A locking system, in particular a locking system for aircraft landing gears. A space-saving, simple construction and little maintenance requirement of the locking system is achieved by at least one electromechanical drive unit, whose torque is transmitted to a drive shaft with a cam disk via axle-crossing transmitting. With the torque, the cam disk can move the locking system from the locked into the unlocked condition.

19 Claims, 7 Drawing Sheets

LOCKING SYSTEM

BACKGROUND OF THE INVENTION

The present invention relates to a locking system, in particular a locking system for aircraft landing gears according to the description herein, and to a method for operating a locking system for an aircraft.

Nowadays, modern aircraft mostly have hydraulic retractable landing gears. To ensure their air worthiness, in particular in high-speed flight, it is necessary that in operation the landing gear systems of such aircraft can safely be retracted, held and, if necessary, for instance during a landing operation, can just as safely be extended again.

Safely holding has so far been realized by locking systems which are mechanically connected with the structure of the aircraft and in the retracted condition of the landing gear system make a positive connection with the same. Such system is shown for instance in FIG. 1.

Only in the course of an externally activated hook opening movement is the landing gear system positively released and extended either hydraulically or by the acting gravitation. Due to the relatively high reliability requirements for such systems, the external activation of the hook opening movement now is achieved primarily by a hydraulically actuated piston and secondarily by a mechanical cable actuation or by an electromechanical actuating unit.

Figure 1:
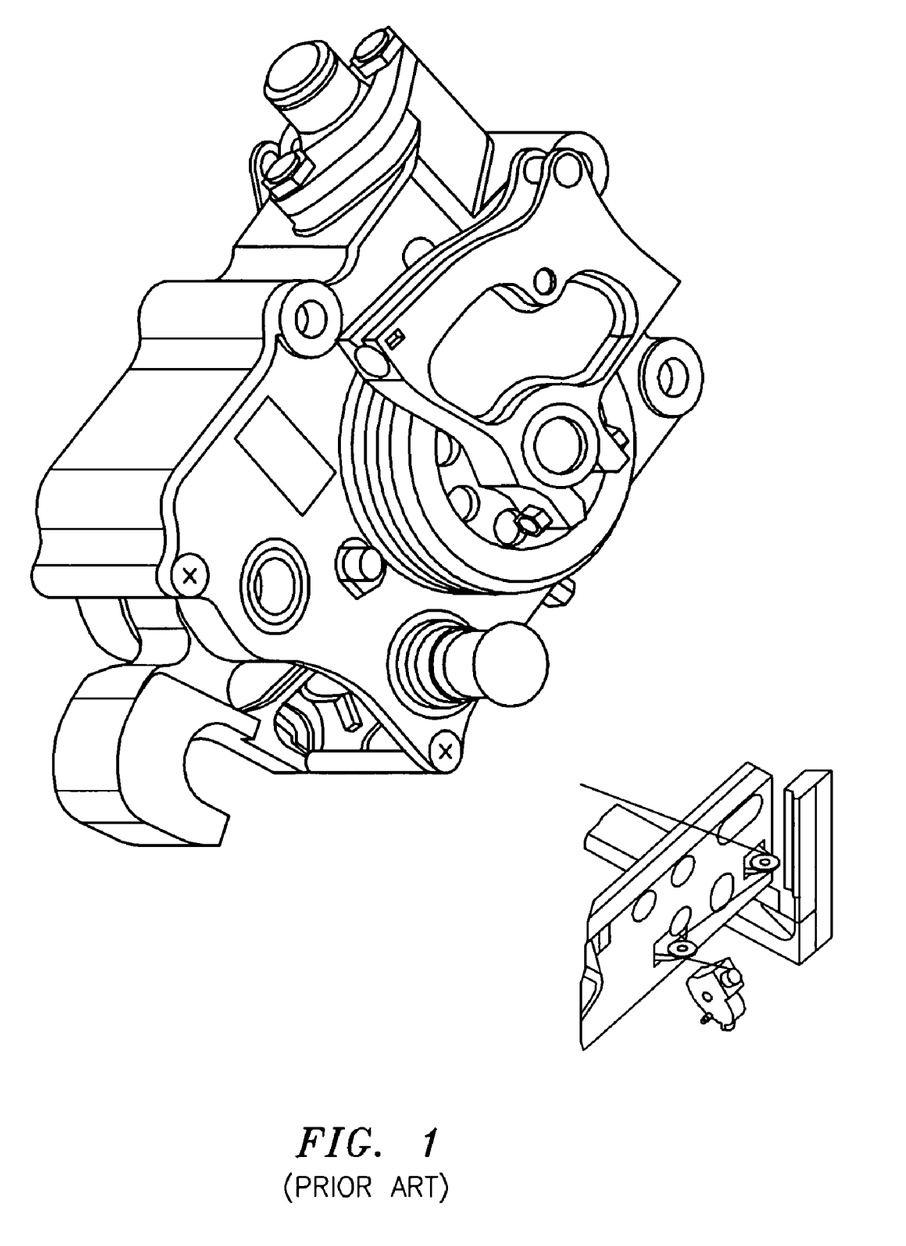
FIG. 1: shows a perspective representation of a locking system for an aircraft in accordance with the prior art.

The cable systems of such mechanical actuating units frequently must be guided through the fuselage of the aircraft via pressure or temperature zones, deflection pulleys, guideways and distributors. What is disadvantageous here is the complex assembly, intensive maintenance and the varying cable tension due to different material properties in the system. FIG. 1 shows such locking system for an aircraft. In the course of an externally activated hook opening movement, the landing gear can positively be released. Among other things, the hook opening movement can be activated mechanically by a cable system. The cable systems must be guided over a plurality of deflection pulleys and guideways, which is very expensive and also susceptible to failure.

Furthermore, locking systems with electromechanical actuating units are known from WO 2005/005252 A1. The same are realized by means of an electromagnetic coil or an electric motor with spindle or the like. Here, it is disadvantageous that the same cannot always be returned to the starting condition by simply shutting off the energy supply and are not capable of a reset/restart in any condition.

SUMMARY OF THE INVENTION

Therefore, it is the object of the present invention to develop a locking system as mentioned above such that the same has a space-saving and simple construction and requires little maintenance.

This object is solved by a locking system with the features herein. Accordingly, a locking system is provided, which in addition to the features known from the prior art includes a first electromechanical drive unit and a transmission as well as axle-crossing transmitting means for transmitting a torque from the drive unit to a drive shaft with a cam disk. The term axle-crossing designates the fact that the torque is transmitted e.g. by means of gear wheels or worm gears from a first shaft to a second shaft arranged at an arbitrary angle with respect to the first shaft. By means of the torque, the cam disk moves the locking system from the first into the second position. In engagement of the first means with the second means, however, both are fixed in the first position.

The first means can constitute e.g. a hook, and the second means can constitute e.g. a bolt. For unlocking the system, a torque is applied by the drive unit, which via the axle-crossing transmitting means is transmitted to a drive shaft which in turn is provided with a cam disk. Due to the rotation of the cam disk, the hook releases the retaining bolt. The retaining bolt advantageously forms part of a landing gear of an aircraft. For locking purposes, hook and bolt are returned to the first position. In the first position, the cam disk is disposed in a neutral position. The neutral position is a position in which the cam disk does not impede the hook in its freedom of movement.

The first driving device can comprise at least one electric motor, and the second driving device can comprise at least one hydraulic drive. By the term "first" and "second" drive unit it should, however, not be understood that e.g. the "first" drive unit necessarily is in primary use. This involves the advantage that for instance for the case of the failure of the aircraft hydraulics for instance the second driving device fails, but for instance the first driving device is ready for operation due to a different kind of drive. Consequently, the landing gear then can easily be unlocked, and the aircraft can be prepared for landing.

In addition, a first spring element advantageously is provided, which retracts the cam disk into the neutral position. This involves the advantage that the cam disk can be retracted in a simple manner without applying a torque by a drive unit. As a result, it still is possible to initiate retraction by the spring element with a single event, for instance by pressing a key.

The first means also can include an activating lever which is rotatably mounted on a shaft, and furthermore a hook which likewise is rotatably mounted on a shaft. The activating lever and the hook are connected with each other by a second spring element. This arrangement involves the advantage that the lever action can advantageously be used for the locking and unlocking operations.

Furthermore, the activating lever can comprise a rotatably mounted roller, on which the cam disk is at least partly rolling when transmitting the torque during the movement from the first into the second position. This roller involves the advantage that the frictional resistance occurring in the cam disk during rolling is kept as low as possible.

Another advantageous embodiment can consist in that in the second position the second spring element holds the activating lever and the hook in a stable position due to the spring force, which stable position can only be left by returning the locking bolt into the first position. This involves the advantage that separate retracting devices can be omitted.

It is likewise conceivable that the cam disk is connected with a freewheeling clutch. This involves the advantage that the cam disk on the one hand can transmit the torque with which the locking system is transferred from the first into the second position in one direction, and for instance for retracting the cam disk the same is decoupled from the drive unit.

The axle-crossing transmitting means advantageously can be configured as a worm or worm gear. This involves the advantage that an axle-crossing torque transmission can be realized with little space requirement.

It is likewise conceivable to configure the axle-crossing transmitting means as a gear wheel transmission, bevel gear transmission or friction gear transmission.

It is conceivable to configure the drive unit as an electric motor with a linearly arranged transmission. This arrangement allows an easy handling during assembly.

It can likewise be provided to configure the drive unit as a direct drive with a ring traveller/planetary gear combination.

This involves the advantage that large gear ratios or large torques can be realized, and this with little space requirement.

In addition, it can be provided that the drive unit comprises redundant electric motors with freewheels and a transmission in a linear arrangement. As a result, the failure probability of the device can be reduced.

It can likewise be provided that the drive unit comprises redundant electric motors with freewheels and a transmission in a compact arrangement. Beside the failure-safety, this involves the advantage that the space requirement is further reduced.

It is furthermore conceivable that the drive unit comprises redundant electric motors with freewheels and a transmission in a 90° arrangement.

It can also be provided that the drive unit comprises an electric motor and a transmission in a linear arrangement with 900 worm gear transmission and a freewheel integrated in the worm gear.

This invention furthermore relates to a method for operating a locking system, in which for instance the landing gear of an aircraft is locked and unlocked by a locking system in accordance with the invention.

It is conceivable that the method of the invention is performed by the electromechanical drive unit, wherein the drive unit is operated by an on/off key. Thereby, it is avoided that in the case of too long an actuation of the drive, for instance by rotating the cam disk over 360°, there is a risk for the system. Thus, complex and expensive monitoring means can be saved.

It is particularly advantageous when the electromechanical drive unit of the locking system of the invention normally is used for the unlocking operation and the second drive unit is employed in the case of a failure of the electromechanical drive unit. For instance, a failure of the normally used drive unit can be detected by sensors and it can then automatically be switched over to the second drive unit. As a result, e.g. the pilot need not intervene separately.

BRIEF DESCRIPTION OF THE DRAWINGS

Further details and advantages of the invention are explained in detail with reference to an embodiment illustrated in the drawing, in which.

DESCRIPTION OF THE PREFERRED EMBODIMENTS

Figure 2A:
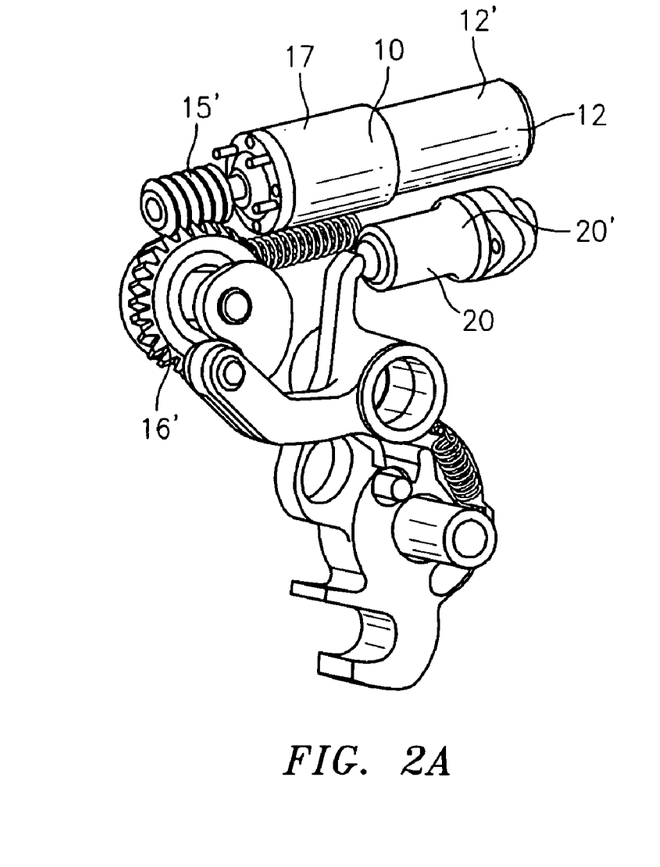
FIGS. 2A and 2B: show perspective representations of the front and rear side of a locking system according to one embodiment of the present invention.
Figure 2B:
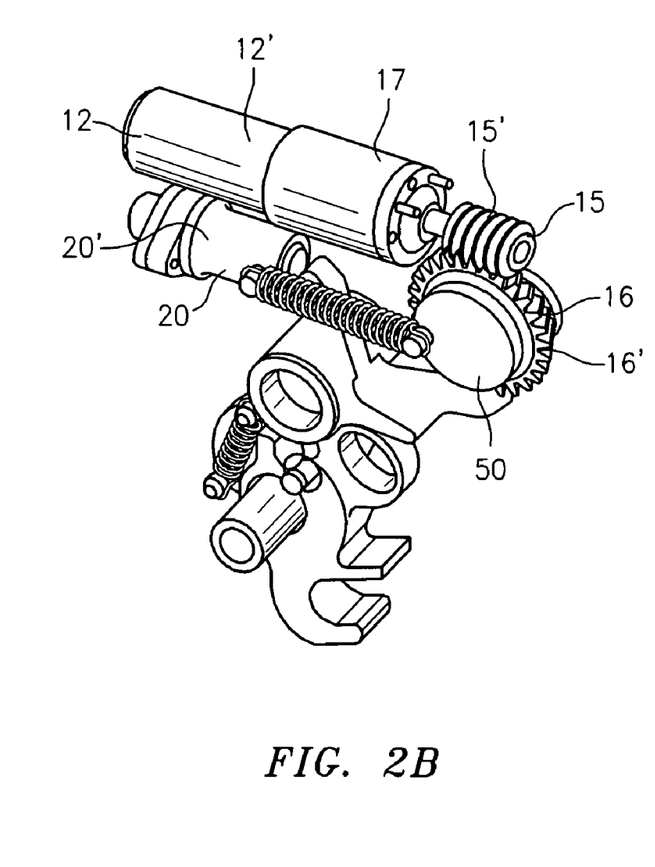
Figure 3:
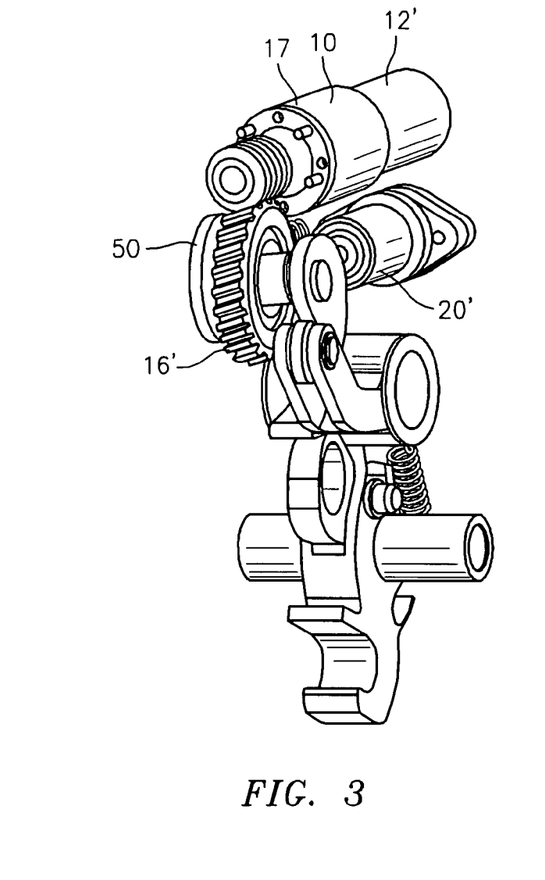
FIG. 3: shows a further perspective representation of the locking system as shown in FIGS. 2A and 2B, FIG. 4: in turn shows a further perspective representation of the locking system as shown in FIGS. 2A and 2B, FIG. 5: shows a side view of the locking system in the first position.
Figure 4:
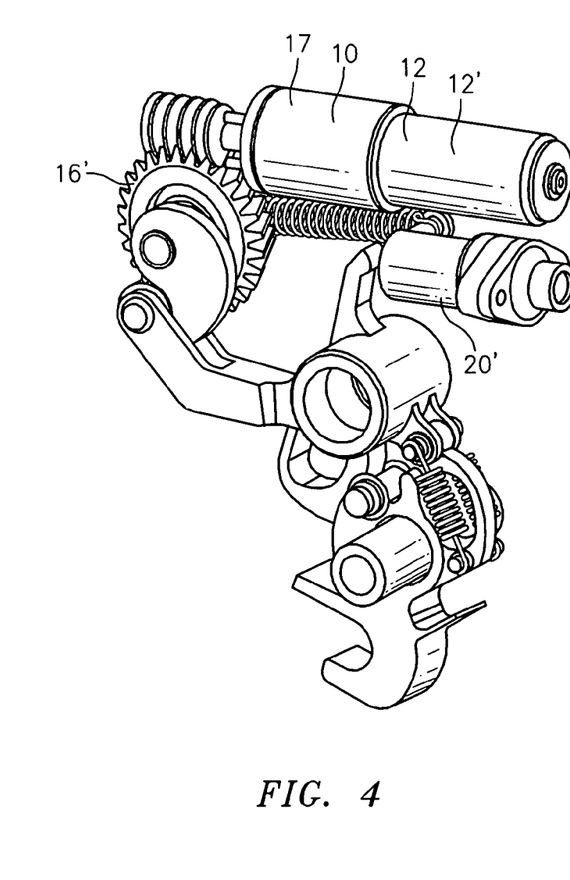

FIGS. 2 to 4 show perspective views of an embodiment of the locking device of the invention for a landing gear of an aircraft in a front and rear view, wherein an embodiment is shown in which two devices are provided for locking and unlocking and in which the first device 10 includes a drive unit 12 with an electric motor 12' and a linearly arranged transmission 17, and the second device 20 includes a hydraulic drive 20'. The axle-crossing transmitting means 15 and 16 are configured as a worm gear transmission 15', 16', wherein the worm gear transmission comprises a freewheel 50 integrated in the worm gear.

Figure 5:
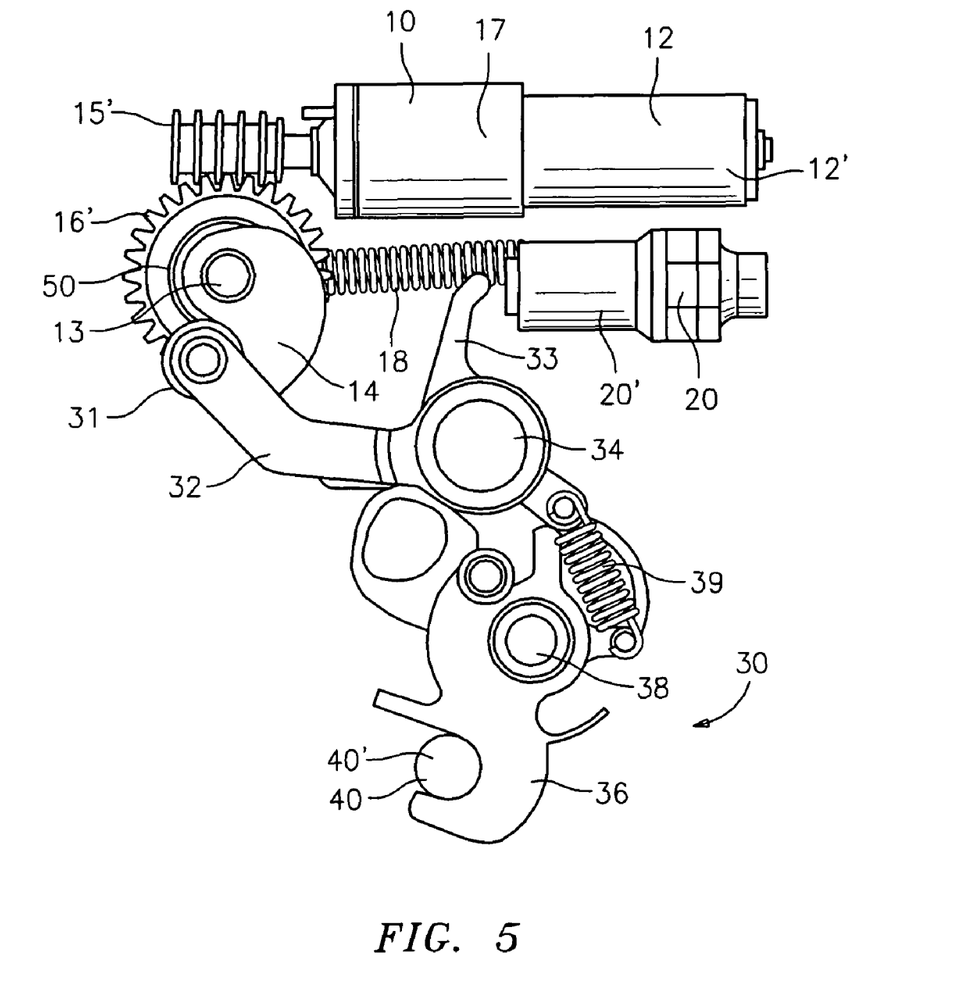

FIG. 5 shows the embodiment of the locking system of the invention in a side view. It is disposed in the first position, in which the system is locked. The first means 30 engages in the second means 40. The second means 40 is a locking bolt 40' of a landing gear system, and in the retracted condition of the landing gear system the means 30 can engage in the locking bolt 40'. The first means 30 includes an activating lever 32, which is rotatably mounted on a shaft 34. It likewise includes a hook 36, which is rotatably mounted on the shaft 38, wherein the activating lever 32 and the hook 36 are connected with each other by the spring element 39, which is configured as a double spring. In the first position, the means 30 engages in the locking bolt 40' via the hook 36. The activating lever 32 in addition includes a rotatably mounted roller 31, on which the cam disk 14 can at least partly roll when moving from the first into the second position. Via the first device 10 or via the second device 20, the locking system can be moved from the first into the second position.

To guide the locking system from the first into the second position and thus unlock the system, a torque is applied by the drive unit 12, which via the axle-crossing transmitting means 15' and 16' rotates the cam disk 14 mounted on the shaft 13 in anticlockwise direction. The cam disk 14 at least partly rolls on the roller 31. As a result, an activating lever 32 can be depressed, whereby the hook 36 releases the bolt 40. Via the spring 18, the cam disk 14 can be retracted due to the freewheel 50 without cooperation of the drive unit 12.

For safety reasons, a redundant driving device 20 is provided, which includes a hydraulic drive 20'. The same can depress the activating lever 32 via a lever 33.

Figure 6:
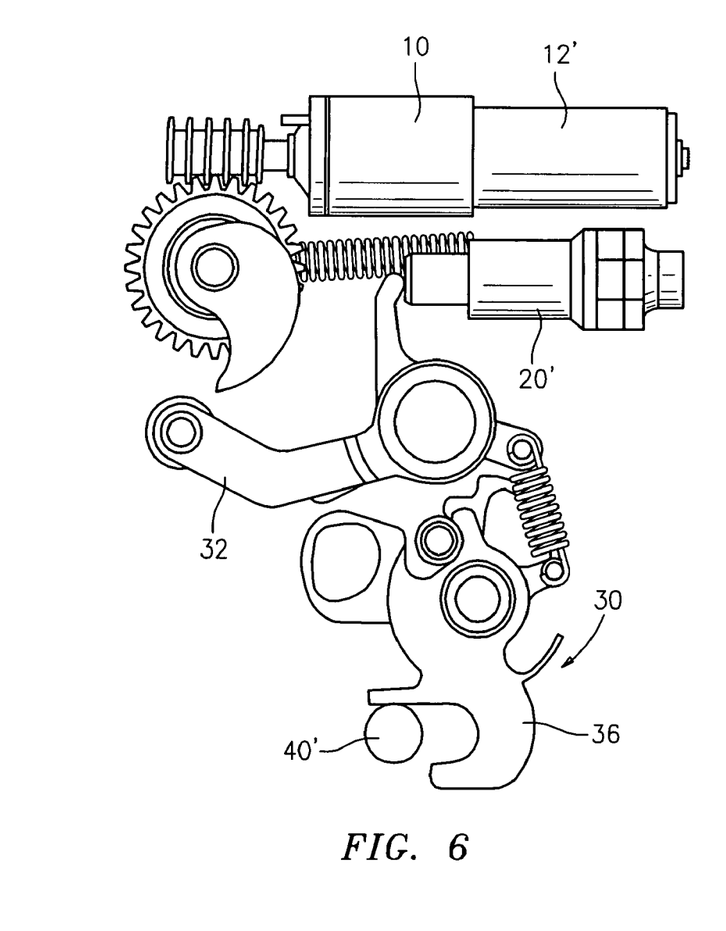
FIG. 6: shows a side view of the locking system in the second position, unlocked by the device 20.

FIG. 6 shows the locking system in the unlocked condition in the second position, illustrated in a side view. The hydraulic drive 20' is extended, whereby the activating lever 32 is depressed via the lever 33. As a result, the hook 36 releases the locking bolt 40'.

Figure 7:
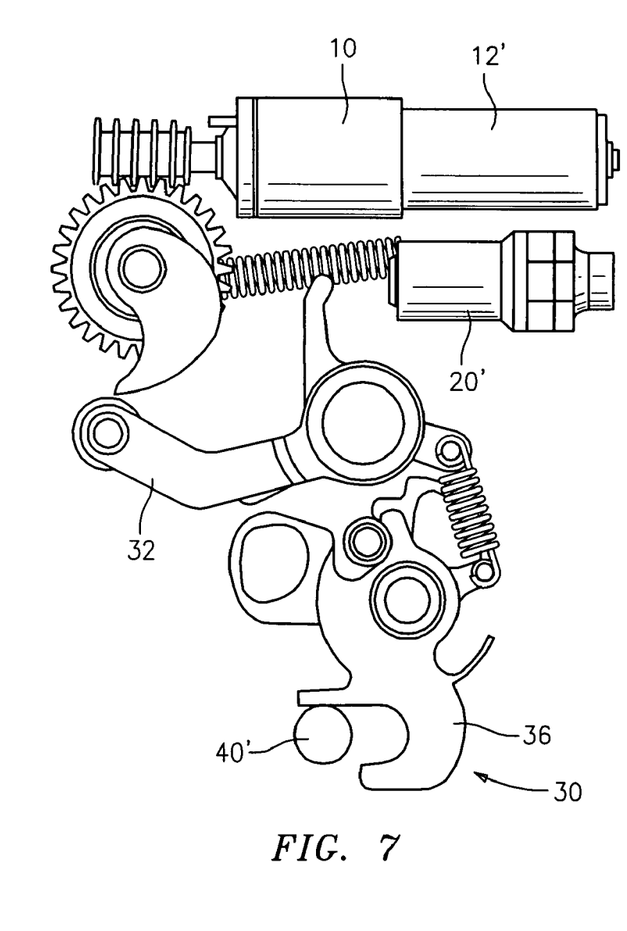
FIG. 7: shows a side view of the locking system, unlocked by the device 10.

FIG. 7 shows the locking system in the second position in a side view. By means of the drive unit 12 with the electric motor 12', a torque is provided, which is transmitted to the cam disk 14 via the axle-crossing worm gear transmission 15', 16'. Said cam disk depresses the activating lever 32, whereby the hook 36 releases the locking bolt 40.

Figure 8:
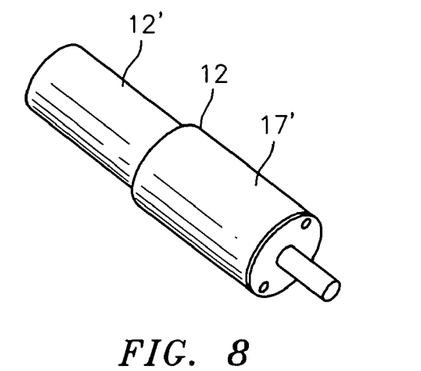
FIG. 8: shows an electric motor and a transmission of the locking system in a linear arrangement.

FIG. 8 shows the drive unit 12 in a perspective view. The drive unit 12 includes an electric motor 12' and furthermore a linearly arranged transmission 17'.

Figure 9:
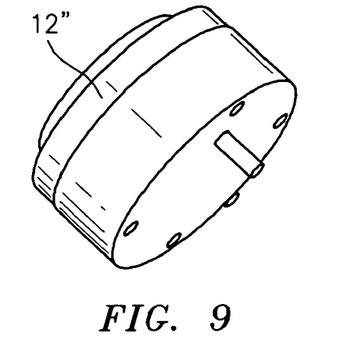
FIG. 9: shows a direct drive with ring traveller/planetary transmission combination in a perspective view.

FIG. 9 shows a perspective view of the drive unit 12 configured as a direct drive 12". The transmission is configured as a ring traveller/planetary transmission combination.

Figure 10:
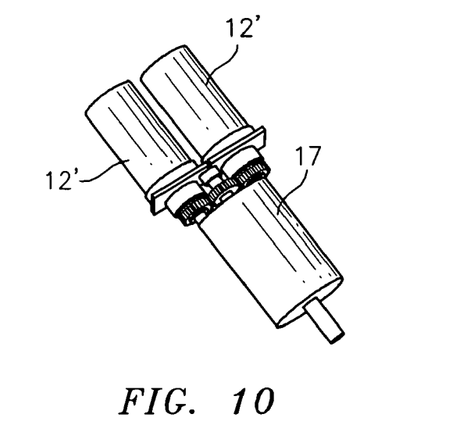
FIG. 10: shows a redundant electric motor with freewheels and a transmission in a linear arrangement in a perspective view.

FIG. 10 shows the drive unit 12 in a perspective view. The drive unit 12 include two redundant electric motors 12' with freewheels. The transmission 17 is arranged linearly with respect to the two redundant electric motors 12'.

Figure 11:
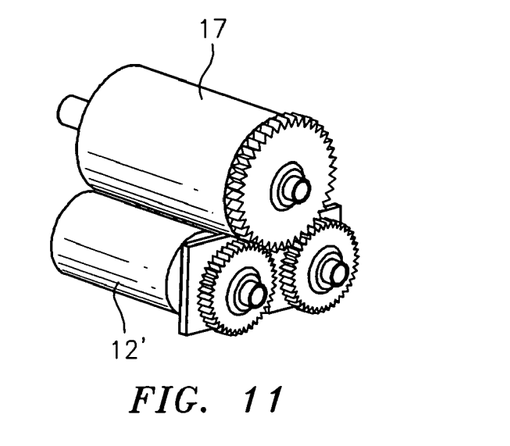
FIG. 11: shows redundant electric motors with freewheels and a transmission in a compact arrangement in a perspective view.

FIG. 11 shows the drive unit 12 in a perspective view, wherein two redundant electric motors 12' are provided. The transmission 17 is disposed above the two redundant electric motors 12', so that a compact arrangement is obtained.

Figure 12:
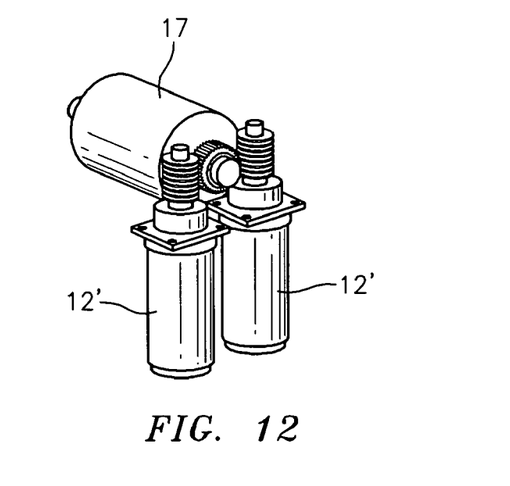
FIG. 12: shows redundant electric motors with freewheels and a transmission in a 90° arrangement via worm gears in a perspective view.

FIG. 12 shows the drive unit 12 configured with two redundant electric motors 12'. The two redundant electric motors 12' are provided with freewheels, wherein the transmission is arranged at an angle of 90° via worm gears.

Figure 13:
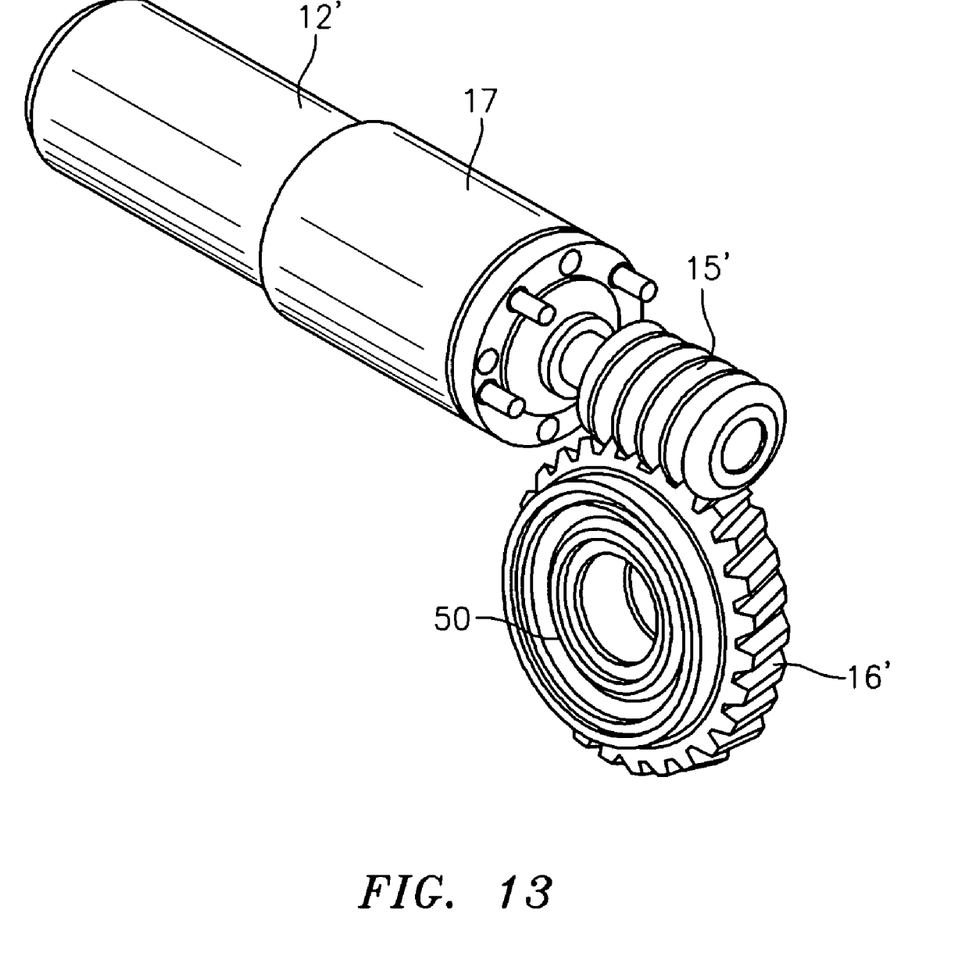
FIG. 13: shows an electric motor and transmission in a perspective view with worm gear transmission and an integrated freewheel in the worm gear.

FIG. 13 shows the electric motor 12' and the transmission 17 in a linear arrangement. The worm gear transmission is arranged at an angle of 90° and consists of the worm 15' and the worm gear 16'. The worm gear 16' has a freewheeling clutch 50.

The invention claimed is:

1. A locking system with redundant driving devices, wherein at least one first driving device (10) and one second driving device (20) are provided for locking and unlocking,
the first driving device (10) has a kind of drive other than the second driving device (20),
the locking system can be locked and unlocked independently with the driving devices (10, 20),
for the purpose of locking, in a first position first means (30) positively engages in second means (40) and for the purpose of unlocking, in a second position the first means (30) releases the second means (40),
the first driving device (10) includes an electromechanical drive unit (12) and a transmission (17) and axle-crossing transmitting means (15, 16) are provided for transmitting a torque from the drive unit (12) to a drive shaft (13) with a cam disk (14), the cam disk (14) moves the locking system from the first into the second position, in which the first means (30) is released from the second means (40), by the torque.

2. The locking system according to claim 1, wherein the locking system is a locking system of an aircraft landing gear and the first means (30) includes at least one hook (36) and the second means (40) includes a retaining bolt (40'), the hook (36) is rotatably mounted on a shaft (38) and in the first position positively engages in a retaining bolt (40') of the aircraft landing gear.

3. The locking system according to claim 1, wherein the first driving device comprises at least one electric motor (12') and the second driving device (20) comprises at least one hydraulic drive (20').

4. The locking system according to claim 1, wherein a first spring element (18) is provided, which retracts the cam disk (14) into the neutral position.

5. The locking system according to claim 4, wherein in the second position the second spring element (39) holds the activating lever (32) and the hook (36) in a stable position by spring force, which stable position can only be left by returning the locking bolt (40') into the first position.

6. The locking system according to claim 1, wherein the first means (30) includes an activating lever (32) which is rotatably mounted on a shaft (34), the activating lever (32) and the hook (36) are connected with each other by a second spring element (39).

7. The locking system according to claim 1, wherein the activating lever (32) includes a rotatably mounted roller (31), on which the cam disk (14) is at least partly rolling when moving from the first into the second position.

8. The locking system according to claim 1, wherein the cam disk (14) is connected with a freewheeling clutch (50).

9. The locking system according to claim 8, wherein the first spring element (18) is connected with the freewheeling clutch (50) and upon travelling over the dead-center position retracts the cam disk (14) in the freely rotatable direction of the freewheeling clutch (50).

10. The locking system according to claim 1, wherein the axle-crossing transmitting means (15, 16) are configured as worm (15') and worm gear (16').

11. The locking system according to claim 1, wherein the axle-crossing transmitting means (15, 16) are configured as a gear wheel transmission or bevel gear transmission or friction gear transmission.

12. The locking system according to claim 1, wherein the first driving device (10) includes an electric motor (12') with a linearly arranged transmission (17).

13. The locking system according to claim 1, wherein the first driving device (10) includes a direct drive (12") with a ring traveller/planetary gear combination.

14. The locking system according to claim 1, wherein the first driving device (10) includes redundant electric motors (12') with freewheels and a transmission (17) in a linear arrangement.

15. The locking system according to claim 1, wherein the first driving device (10) includes redundant electric motors (12') with freewheels and a transmission (17) in a compact arrangement.

16. The locking system according to claim 1, wherein the first driving device (10) includes redundant electric motors (12') with freewheels and a transmission (17) in a 90° arrangement.

17. The locking system according to claim 1, wherein the first driving device (10) includes an electric motor (12') and a transmission (17) in a linear arrangement with a 90° worm gear transmission and a freewheel (50) integrated in the worm gear.

18. The locking system according to claim 1, wherein the drive unit (12) is operated via an on/off key.

19. The locking system according to claim 1, wherein the drive unit (12) normally is used for the unlocking operation and the second driving unit (20) is employed in the case of a failure of the drive unit (12).

* * * * *